United States Patent
Park

(10) Patent No.: US 11,448,817 B2
(45) Date of Patent: Sep. 20, 2022

(54) OPTICAL FILM HAVING INCLINED FILMS, AND BACKLIGHT UNIT AND DISPLAY DEVICE USING THE SAME

(71) Applicant: LG Display Co., Ltd., Seoul (KR)

(72) Inventor: JaeHyun Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 959 days.

(21) Appl. No.: 16/210,344

(22) Filed: Dec. 5, 2018

(65) Prior Publication Data

US 2019/0187361 A1 Jun. 20, 2019

(30) Foreign Application Priority Data

Dec. 19, 2017 (KR) ......................... 10-2017-0174991

(51) Int. Cl.
| | |
|---|---|
| F21V 8/00 | (2006.01) |
| G02B 6/00 | (2006.01) |
| G02B 27/28 | (2006.01) |
| G02F 1/13357 | (2006.01) |

(Continued)

(52) U.S. Cl.
CPC ............. *G02B 6/0056* (2013.01); *G02B 5/30* (2013.01); *G02B 27/285* (2013.01); *G02F 1/13362* (2013.01); *G02F 1/133605* (2013.01); *G02F 1/133607* (2021.01)

(58) Field of Classification Search
CPC .. G02B 5/3083; G02B 6/0055; G02B 6/0056; G02B 6/4214; G02B 17/006; G02B 19/009; G02B 27/285; G02B 2207/123; G02F 1/133524; G02F 1/133536; G02F 1/133605; G02F 1/133607; G02F 1/13362
See application file for complete search history.

(56) References Cited

U.S. PATENT DOCUMENTS

| | | |
|---|---|---|
| 10,578,884 B2 | 3/2020 | Carls et al. |
| 2005/0248845 A1 | 11/2005 | Seo et al. |
| 2009/0052031 A1 | 2/2009 | Yamada et al. |

(Continued)

FOREIGN PATENT DOCUMENTS

| | | |
|---|---|---|
| CN | 101510010 A | 8/2009 |
| CN | 101943800 A | 1/2011 |

(Continued)

OTHER PUBLICATIONS

Office Action dated Oct. 30, 2020, in corresponding Chinese Patent Application No. 201811552049.2.

*Primary Examiner* — Ryan S Dunning
(74) *Attorney, Agent, or Firm* — Morgan, Lewis & Bockius LLP

(57) ABSTRACT

An optical film, a backlight unit, and a display device are provided. An optical film includes: a plurality of base layers arranged at predetermined intervals in a horizontal direction, and a plurality of barriers respectively provided between pairs of the plurality of base layers, wherein each of the plurality of barriers includes first and second films inclined with a first inclined angle with respect to a lower surface of each of the plurality of base layers, wherein the first film is configured to: transmit light polarized in a first direction, and reflect light polarized in a second direction perpendicular to the first direction, and wherein the second film is configured to phase-retard the light polarized in the first direction to the light polarized in the second direction.

17 Claims, 8 Drawing Sheets

(51) Int. Cl.
*G02B 5/30* (2006.01)
*G02F 1/1335* (2006.01)

(56) References Cited

U.S. PATENT DOCUMENTS

| | | | |
|---|---|---|---|
| 2011/0002039 A1 | 1/2011 | Seo et al. | |
| 2015/0098128 A1 | 4/2015 | Carls et al. | |
| 2018/0164637 A1* | 6/2018 | Min | G02F 1/13362 |

FOREIGN PATENT DOCUMENTS

| | | |
|---|---|---|
| CN | 104428696 A | 3/2015 |
| DE | 10 2005 060 517 A1 | 6/2007 |
| JP | 2000-330197 A | 11/2000 |
| KR | 10-1059162 B1 | 8/2011 |

* cited by examiner

OPTICAL FILM HAVING INCLINED FILMS, AND BACKLIGHT UNIT AND DISPLAY DEVICE USING THE SAME

CROSS-REFERENCE TO RELATED APPLICATION(S)

This application claims the benefit of and priority to Korean Patent Application No. 10-2017-0174991, filed on Dec. 19, 2017, the entirety of which is hereby incorporated by reference.

BACKGROUND

1. Technical Field

The present disclosure relates to an optical film, a backlight unit, and a display device using the same, and more particularly, to an optical film arranged between a light source and a display panel, and a backlight unit and a display device using the same.

2. Discussion of the Related Art

A display device may include a display panel and a backlight unit for supplying light to the display panel, and the backlight unit may include an optical film. The optical film is arranged between the light source and the display panel to normally supply light emitted from the light source to the display panel.

Examples of the optical film may include a diffusion film, a prism film, and a luminance enhancement film. The diffusion film diffuses the light emitted from the light source to uniformly supply the light to the display panel. The prism film condenses the light emitted from the light source to vertically supply the light to the display panel. The luminance enhancement film supplies the light to the display panel by minimizing loss of the light emitted from the light source, whereby luminance of the display device may be improved.

In the related art, the optical film is configured by proper combination of the diffusion film, the prism film, and the luminance enhancement film in accordance with realization of a desired effect. However, the effect of luminance enhancement is not obtained in an arrangement structure of prisms for improving a light-condensing effect in combination of the prism film and the luminance enhancement film. Furthermore, if the arrangement structure of the prism is changed to obtain the luminance enhancement effect, a problem occurs in that the light-condensing effect is reduced.

SUMMARY

Accordingly, embodiments of the present disclosure are directed to an optical film, a backlight unit, and a display device using the same that substantially obviate one or more of the issues due to limitations and disadvantages of the related art.

An aspect of the present disclosure is to provide an optical film and a backlight unit and a display device using the same in which a light-condensing effect and a luminance enhancement effect may be improved at the same time.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided an optical film, including: a plurality of base layers arranged at predetermined intervals in a horizontal direction, and a plurality of barriers respectively provided between pairs of the plurality of base layers, wherein each of the plurality of barriers includes first and second films inclined with a first inclined angle with respect to a lower surface of each of the plurality of base layers, wherein the first film is configured to: transmit light polarized in a first direction, and reflect light polarized in a second direction perpendicular to the first direction, and wherein the second film is configured to phase-retard the light polarized in the first direction to the light polarized in the second direction.

In another aspect, there is provided a backlight unit, including: a light source, a light guide plate facing the light source and configured to change a path of light emitted from the light source, a reflective plate below the light guide plate, and an optical film above the light guide plate, the optical film including: a plurality of base layers arranged at predetermined intervals in a horizontal direction, and a plurality of barriers respectively provided between pairs of the plurality of base layers, wherein each of the plurality of barriers includes first and second films inclined with a first inclined angle with respect to a lower surface of each of the plurality of base layers, wherein the first film is configured to: transmit light polarized in a first direction, and reflect light polarized in a second direction perpendicular to the first direction, and wherein the second film is configured to phase-retard the light polarized in the first direction to the light polarized in the second direction.

In another aspect, there is provided a display device, including: a backlight unit, and a display panel above the backlight unit, wherein the backlight unit includes an optical film provided below the display panel, and wherein the optical film includes: a plurality of base layers arranged at predetermined intervals in a horizontal direction, and a plurality of barriers respectively provided between pairs of the plurality of base layers, wherein each of the plurality of barriers includes first and second films inclined with a first inclined angle with respect to a lower surface of each of the plurality of base layers, wherein the first film is configured to: transmit light polarized in a first direction, and reflect light polarized in a second direction perpendicular to the first direction, and wherein the second film is configured to phase-retard the light polarized in the first direction to the light polarized in the second direction.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this disclosure, illustrate embodiments of the disclosure and together with the description serve to explain various principles of the disclosure.

Figure 1:
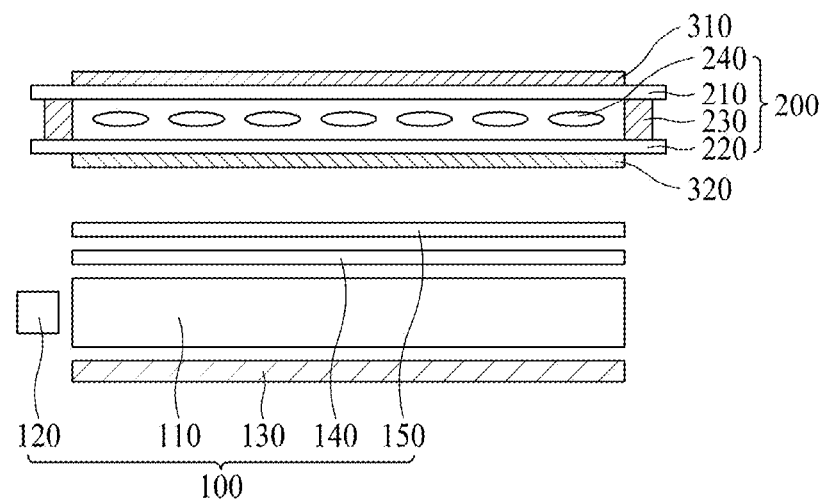
FIG. 1 is a cross-sectional view illustrating a display device according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present disclosure are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, example embodiments of the present disclosure will be described in detail with reference to the accompanying drawings.

FIG. 1 is a cross-sectional view illustrating a display device according to an example embodiment of the present disclosure.

As shown in FIG. 1, the display device according to an example embodiment of the present disclosure may include a backlight unit 100, a display panel 200, and polarizers 310 and 320. The backlight unit 100 may include a light guide plate 110, a light source 120, a reflective plate 130, a diffusion film 140, and an optical film 150.

The light guide plate 110 may change a path of light emitted from the light source 120 to a direction of the display panel 200. Although not shown in detail, for change of the light path, a convex or concave optical pattern may be provided on a lower surface of the light guide plate 110.

The light source 120 may be arranged to face a side of the light guide plate 110, and may emit light to the side of the light guide plate 110. The light source 120 may be made of, but is not limited to, a point light source, such as LED. The reflective plate 130 may be arranged below the light guide plate 110 to upwardly reflect light moving below the light guide plate 110.

The diffusion film 140 may be arranged above the light guide plate 110 to allow the light emitted through the light guide plate 110 to uniformly move to the display panel 200. A bead may be included in the diffusion film 140. Thus, the light entering the diffusion film 140 may be refracted at various angles by the bead, whereby a light diffusion effect may be obtained. This diffusion film 140 may be made of various diffusion films known in the art. However, the diffusion film 140 may be omitted.

The optical film 150 may be above the diffusion film 140. The optical film 150 may be configured to reduce or minimize loss of the incident light, and may move the light in a vertical direction. That is, the optical film 150 may simultaneously perform functions of the prism film and the luminance enhancement film of the related art. The optical film 150 may include a particular reflective polarizing film to reduce or minimize loss of the incident light. Also, the reflective polarizing film may be inclined to move the light in a vertical direction. A detailed configuration of the optical film 150 will be described later.

The display panel 200 may be above the backlight unit 100. The display panel 200 may include a liquid crystal panel that may include an upper substrate 210, a lower substrate 220, a sealant 230, and a liquid crystal layer 240.

Although not shown in detail, color filters patterned per pixel and a light-shielding layer for reducing or preventing light leakage from occurring between pixels may be provided on a lower surface of the upper substrate 210. A thin film transistor, as a switching element, and an electrode for forming an electric field for controlling an arrangement state of the liquid crystal layer 240 may be provided on an upper surface of the lower substrate 220. The sealant 230 may seal the liquid crystal layer 240 while bonding the upper substrate 210 to the lower substrate 220. The liquid crystal layer 240 may be formed between the upper substrate 210 and the lower substrate 220. Thus, an arrangement state of the liquid crystal layer 240 may be controlled by the electric field generated by the electrode provided on the lower substrate 220. The liquid crystal display panel may be provided in various modes known in the art, such as a Twisted Nematic (TN) mode, an In-Plane Switching (IPS) mode, a Vertical Alignment (VA) mode, or a Fringe Field Switching (FFS) mode.

The upper polarizer 310 may be on an upper surface of the display panel 200. The upper polarizer 310 may be attached to the upper surface of the display panel 200, e.g., through a particular adhesive layer. The upper polarizer 310 may have a transmissive axis of a particular direction. Therefore, if the light, which has passed through the liquid crystal layer 240 in the display panel 200, is polarized in the same direction as that of the transmissive axis of the upper polarizer 310, the light may transmit through the upper polarizer 310. Also, if the light, which has passed through the liquid crystal layer 240, is polarized in a direction vertical to that of the transmissive axis of the upper polarizer 310, the light may fail to pass through the upper polarizer 310. Therefore, the light that transmits through the upper polarizer 310 may be controlled by properly controlling the arrangement state of the liquid crystal layer 240 per pixel, whereby an image of a desired color may be realized.

The lower polarizer 320 may be on a lower surface of the display panel 200. The lower polarizer 320 may be attached to the lower surface of the display panel 200, e.g., through a particular adhesive layer.

The lower polarizer 320 may have a transmissive axis in the same direction as a polarizing direction of the light emitted from the backlight unit 100. The light polarized in a particular direction may be emitted from the optical film 150 provided below the lower polarizer 320. The lower polarizer 320 may have a transmissive axis in the same direction as the polarizing direction of the light emitted from the optical film 150, whereby the light emitted from the optical film 150 may enter the display panel 200 by transmitting through the lower polarizer 320.

Therefore, for example, it is presumed that the light polarized in a horizontal direction may be emitted from the optical film 150, and the lower polarizer 320 may have a horizontal transmissive axis, and the upper polarizer 310 may have a vertical transmissive axis. In this case, the light emitted from the optical film 150 and polarized in the horizontal direction may transmit through the lower polarizer 320, and then its polarized state may be changed in a vertical direction while passing through the liquid crystal layer 240 in the display panel 200, whereby the light may transmit through the upper polarizer 310. However, if the polarized state of the light emitted from the optical film 150 is not changed while the light is passing through the liquid crystal layer 240 in the display panel 200, the light may fail to transmit through the upper polarizer 310. As a result, the arrangement state of the liquid crystal layer 240 in the display panel 200 may be controlled to control the light that transmits through the upper polarizer 310 per pixel.

Figure 2:
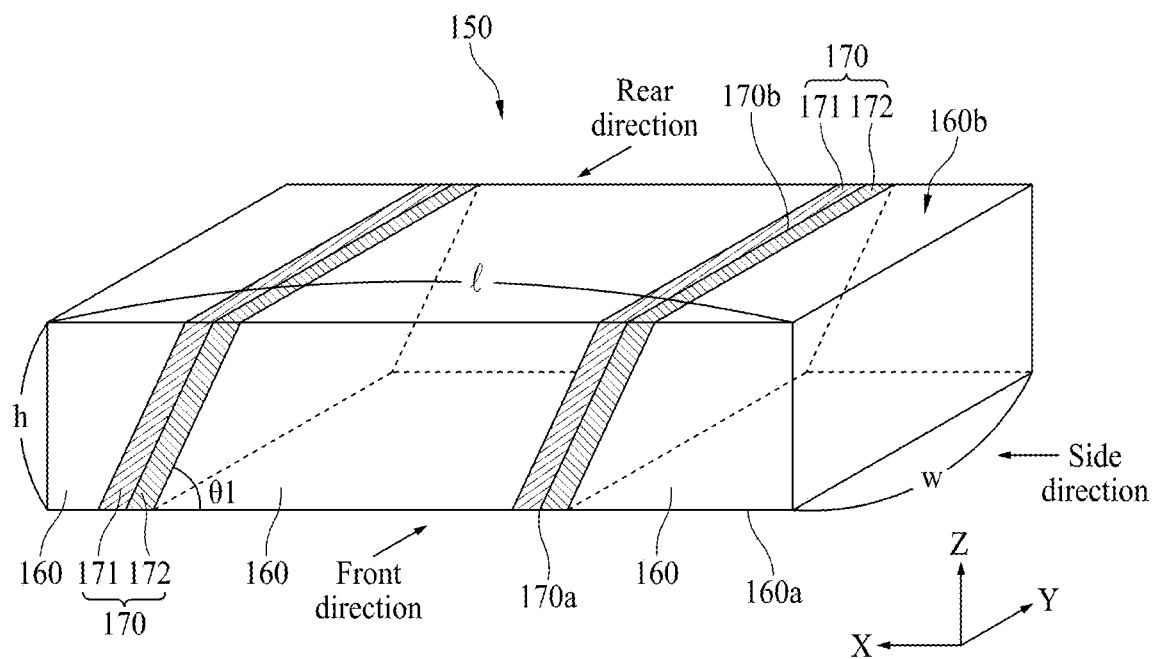
FIG. 2 is a perspective view illustrating an optical film according to an example embodiment of the present disclosure.

FIG. 2 is a perspective view illustrating an optical film according to an example embodiment of the present disclosure.

As shown in FIG. 2, the optical film 150 according to an example embodiment of the present disclosure may have a cuboid structure having a particular length '1' in a first direction (e.g., an X-direction), a particular with 'w' in a second direction (e.g., a Y-direction) and a particular height 'h' in a third direction (e.g., a Z-direction). This optical film 150 may include a plurality of base layers 160 and a plurality of barriers 170.

The plurality of base layers 160 may be arranged at particular intervals in a horizontal direction by interposing the plurality of barriers 170 therebetween. Each of the plurality of base layers 160 may include a lower surface 160a and an upper surface 160b. The lower surface 160a of the base layer 160 may be a surface at which light may enter, and the upper surface 160b of the base layer 160 may be a surface at which light may be emitted. The lower surface 160a of the base layer 160 may be in parallel with the upper surface 160b of the base layer 160. Also, the lower surfaces 160a of the respective base layers 160 may be on the same plane, and may constitute a part of the lower surface of the optical film 150. The upper surfaces 160b of the respective base layers 160 may be arranged on the same plane, and may constitute a part of the upper surface of the optical film 150. Therefore, the height 'h' of each of the plurality of base layers 160, which corresponds to a vertical distance from the lower surface 160a to the upper surface 160b, may be the same as the height 'h' of the optical film 150.

The base layer 160, provided with the barrier 170 at each of left and right sides, may include a vertical section as viewed in a front direction and a rear direction, and a vertical section as viewed in a side direction, wherein the vertical section as viewed in the front direction and the rear direction may have a parallelogram structure, and the vertical section as viewed in the side direction may have a rectangular structure. On the contrary, the base layer 160, provided with the barrier 170 at only a left or right side, that is, the base layer 160 provided with the barrier 170 at the left-most or the right-most side, may include a vertical section as viewed in a front direction, and a vertical section as viewed in a side direction, wherein the vertical section as viewed in the front direction may have a trapezoidal structure, and the vertical section as viewed in the side direction may have a rectangular structure. In this way, the vertical section structure of the base layer 160 may be varied depending on its position, e.g., due to the plurality of barriers 170 of an inclined structure being included in the optical film 150 of a cuboid structure.

However, the vertical section structure of the base layer 160 is not limited to the above example, and the base layer 160, provided with the barrier 170 at the left-most or the right-most side, may be provided such that the vertical section as viewed in the front direction and the rear direction may have a parallelogram structure in the same manner as the base layer 160, provided with the barrier 170 at each of the left and right sides. In this case, the optical film 150 may have the same structure as that of the base layer 160, without being a cuboid structure. As used in this disclosure, a front surface of the base layer 160 or the barrier 170 is a surface at which the barrier 170 may be viewed to be inclined from the lower surface to the upper surface of the optical film 150, a rear surface of the base layer or the barrier 170 is a surface facing the front surface, and a side of the base layer 160 or the barrier 170 is a surface for connecting the front surface with the rear surface and excluding the upper surface and the lower surface.

The plurality of base layers 160 may be made of a transparent material. The plurality of base layers 160 may not have polarized characteristics. Therefore, light in all polarized directions, which may include light polarized in a first direction and light polarized in a second direction vertical to the first direction, may transmit the plurality of base layers 160.

The plurality of barriers 170 may be between the base layers 160 adjacent to each other. That is, when viewed from the front direction, the base layer 160 may be provided at each of the left and right sides of each of the plurality of barriers 170. The plurality of barriers 170 may be in contact with the plurality of base layers 160. For example, the sides of the plurality of barriers 170 may be in contact with the sides of the plurality of base layers 160.

Each of the plurality of barriers 170 may include a lower surface 170a and an upper surface 170b. The lower surface 170a and the upper surface 170b of the barrier 170 may be in parallel with each other. Also, the respective lower surfaces 170a of the plurality of barriers 170 may be on the same plane to constitute a part of the lower surface of the optical film 150, and the respective upper surfaces 170b of the plurality of barriers 170 may be on the same plane to constitute a part of the upper surface of the optical film 150. Therefore, the height 'h' of each of the plurality of barriers 170, which corresponds to a vertical distance from the lower surface 170a to the upper surface 170b, may be the same as the height 'h' of the optical film 150. Finally, the respective lower surfaces 170a of the plurality of base layers 160 and the respective lower surfaces 170a of the plurality of barriers 170 may be on the same plane to constitute the lower surface of the optical film 150, and the respective upper surfaces 160b of the plurality of base layers 160 and the respective upper surfaces 170b of the plurality of barriers 170 may be on the same plane to constitute the upper surface of the optical film 150.

Each of the plurality of barriers 170 may have a surface inclined with a first inclined angle $\theta1$ with respect to the lower surface of the optical film 150 made by combination of the lower surface 170a of the barrier 170 and the lower surface 160a of the base layer 160 when viewed from the front direction. The inclined surface may be extended along the width 'w' direction (e.g., the y-direction) while maintaining the first inclined angle $\theta1$. Therefore, the structure of the barrier 170 as viewed in the side direction may be seen as a substantially similar rectangular structure as that of the vertical section of the base layer 160 viewed in the side direction.

Each of the plurality of barriers 170 may include a first film 171 and a second film 172. The first film 171 and the second film 172 may be in contact, e.g., direct contact, with each other. Therefore, the lower surface 170a of the barrier 170 may be configured by combination of the lower surface of the first film 170 and the lower surface of the second film 172, and the upper surface 170b of the barrier 170 may be configured by combination of the upper surface of the first film 171 and the upper surface of the second film 172.

The first film 171 and the second film 172 may be arranged in each of the plurality of barriers 170 in the same order. For example, when viewed from the front direction, in each of the plurality of barriers 170, the first film 171 may be at the left side, and the second film 172 may be at the right side. Therefore, incident light from the lower surface 160a of the base layer 160 may first transmit through the first film 171, and then may transmit the second film 172 in each barrier 170. In this case, in two barriers 170 of the left and right sides, which may face each other with one base layer 160 interposed therebetween, the second film 172 constituting the left barrier 170 may face the first film 171 constituting the right barrier 170.

Each of the first film 171 and the second film 172 may have a surface inclined with a first inclined angle $\theta1$ with respect to the lower surface of the optical film 150 when viewed from the front direction, wherein the inclined surface may extend along the width 'w' direction (y-direction) while maintaining the first inclined angle $\theta1$. Therefore, the structure of each of the first film 171 and the second film 172 viewed in the side direction is seen as a substantially similar rectangular structure as that of the vertical section of the base layer 160 viewed in the side direction.

The first film 171 may include a reflective polarizing film, and the second film 172 may include a phase retardation film. The first film 171 and the second film 172 will be described with reference to FIGS. 3A to 5B.

Figure 3A:
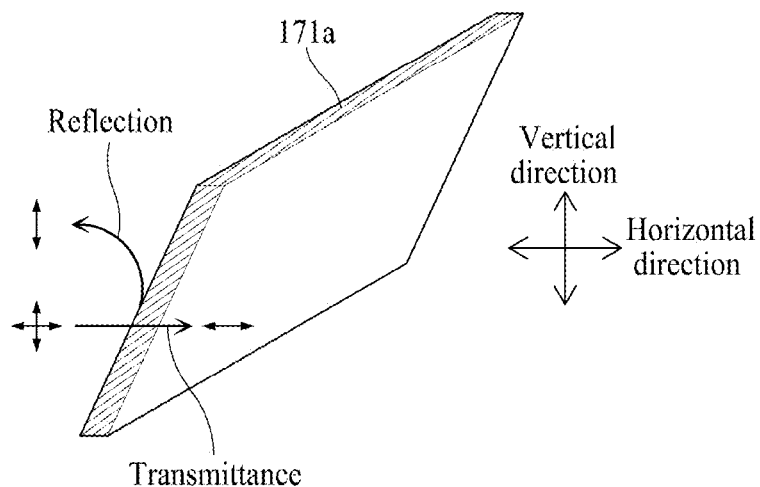
FIGS. 3A and 3B are perspective views illustrating a principle of a first film according to various example embodiments of the present disclosure.
Figure 3B:
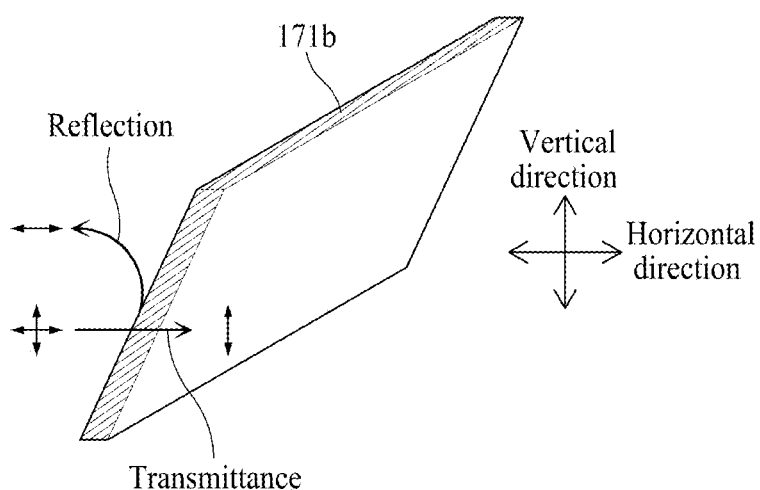

FIGS. 3A and 3B are perspective views illustrating a principle of a first film according to various example embodiments of the present disclosure.

As seen from FIG. 3A, the first film 171a according to an example embodiment of the present disclosure may transmit light polarized in a first direction, for example, in a horizontal direction, and may reflect light polarized in a second direction vertical to the first direction, for example, in a vertical direction. That is, if light, which may include light polarized in the horizontal direction and light polarized in the vertical direction, enters the first film 171a, the light polarized in the horizontal direction may transmit through the first film 171a, but the light polarized in the vertical direction may be reflected from the first film 171a.

As seen from FIG. 3B, the first film 171b according to another embodiment of the present disclosure may transmit light polarized in a second direction, for example, in a vertical direction, and may reflect light polarized in a first direction vertical to the second direction, for example, in a horizontal direction. That is, if light, which may include light polarized in the horizontal direction and light polarized in the vertical direction, enters the first film 171b, the light polarized in the vertical direction may transmit through the first film 171b, but the light polarized in the horizontal direction may be reflected from the first film 171b.

As described above, the first films 171a and 171b according to an example embodiment of the present disclosure may include reflective polarizing films that may transmit light polarized in a particular direction, and may reflect light polarized in a direction vertical to the particular direction.

The reflective polarizing film may include a film known in the art. For example, the reflective polarizing film may include a dual brightness enhancement film (DBEF), a Bragg reflector, a left hand twisted cholesteric liquid crystal, and/or a right hand twisted cholesteric liquid crystal.

Figure 4:
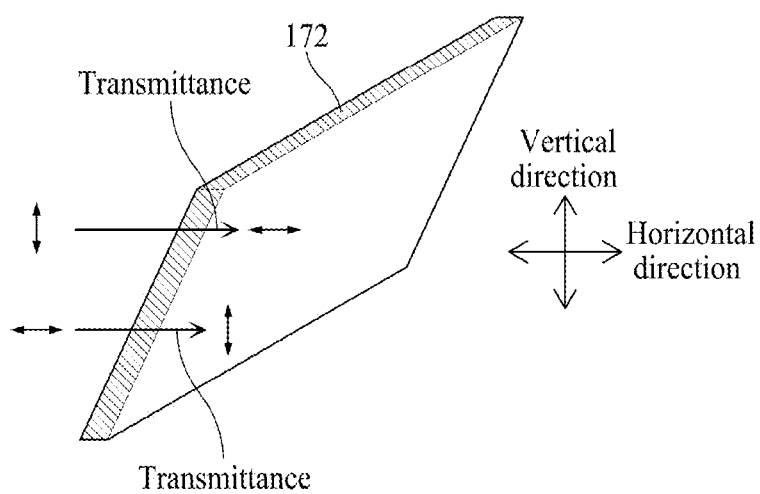
FIG. 4 is a perspective view illustrating a principle of a second film according to an example embodiment of the present disclosure.

FIG. 4 is a perspective view illustrating a principle of a second film according to an example embodiment of the present disclosure.

As seen from FIG. 4, a second film 172 according to an example embodiment of the present disclosure may phase-retard light polarized in a first direction, for example, in a horizontal direction to light polarized in a second direction, for example, in a vertical direction, and may phase-retard light polarized in the second direction, for example, in the vertical direction to light polarized in the first direction, for example, in the horizontal direction. That is, if light polarized in the horizontal direction enters the second film 172, light that has been phase-retarded while transmitting the second film 172 and then polarized in the vertical direction may be emitted. On the contrary, if light polarized in the vertical direction enters the second film 172, light that has been phase-retarded while transmitting the second film 172 and then polarized in the horizontal direction may be emitted. As described above, the second film 172 according to an example embodiments of the present disclosure may include a ½ λ phase retardation film that may retard a phase of incident light as much as ½ λ.

Figure 5A:
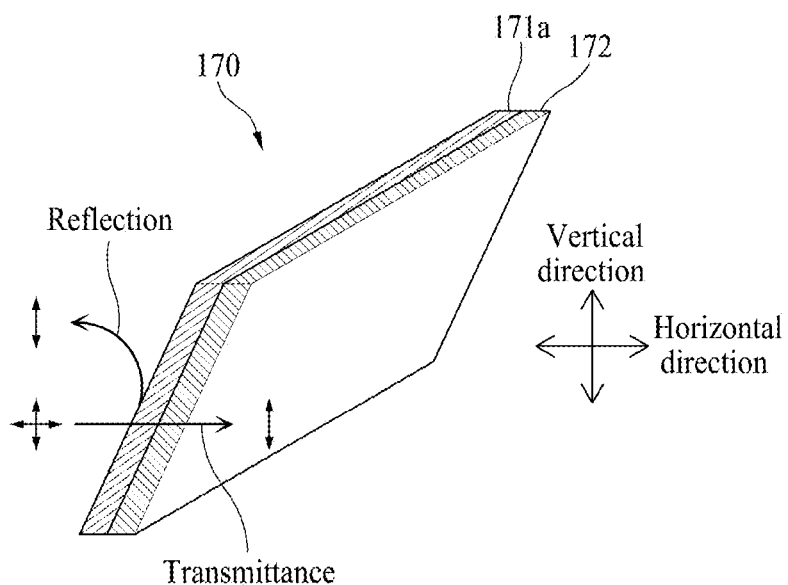
FIGS. 5A and 5B are perspective views illustrating a principle of light transmittance and reflection for a barrier combined by a first film and a second film according to various example embodiments of the present disclosure.
Figure 5B:
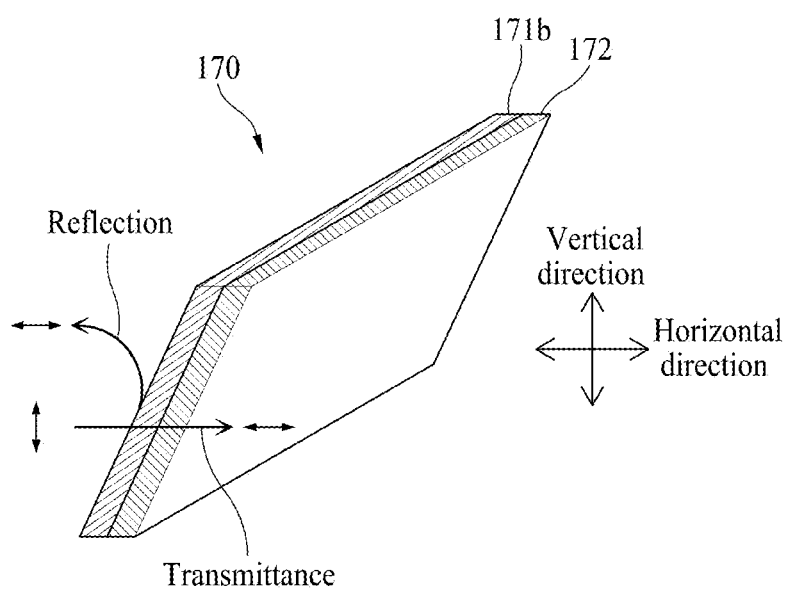

FIGS. 5A and 5B are perspective views illustrating a principle of light transmittance and reflection for a barrier combined by a first film and a second film according to various example embodiments of the present disclosure.

FIG. 5A corresponds to an example in which the first film 171a according to the FIG. 3A example is combined with the second film 172 according to FIG. 4. FIG. 5B corresponds to an example in which the first film 171b according to the FIG. 3B example is combined with the second film 172 according to FIG. 4.

As seen from the example of FIG. 5A, if light, which may include light polarized in a horizontal direction and light polarized in a vertical direction, enters the first film 171a, the light polarized in the vertical direction may be reflected from the first film 171a, and the light polarized in the horizontal direction may transmit through the first film 171a, and then may be phase-retarded in the second film 172. Thus, light polarized in the vertical direction may be emitted.

As seen from the example of FIG. 5B, if light, which may include light polarized in a horizontal direction and light polarized in a vertical direction, enters the first film 171b, the light polarized in the horizontal direction may be reflected from the first film 171b, and the light polarized in the vertical direction may transmit through the first film 171b, and then may be phase-retarded in the second film 172. Thus, light polarized in the horizontal direction may be emitted.

As seen from the examples of FIGS. 5A and 5B, if the barrier 170 is configured by a combination of the first films 171a and 171b and the second film 172, a polarized direction of the light reflected from the first films 171a and 171b may be the same as a polarized direction of the light emitted from the second film 172.

In the optical film 150 according to an example embodiment of the present disclosure, by using the characteristic that the polarized direction of the light reflected from the first films 171a and 171b is the same as the polarized direction of the light emitted from the second film 172, loss of the light emitted from the light source and then entering the optical film 150 may be reduced or minimized, and the light emitted from the optical film 150 may be moved in a vertical direction. This will be described with reference to FIGS. 6A and 6B.

Figure 6A:
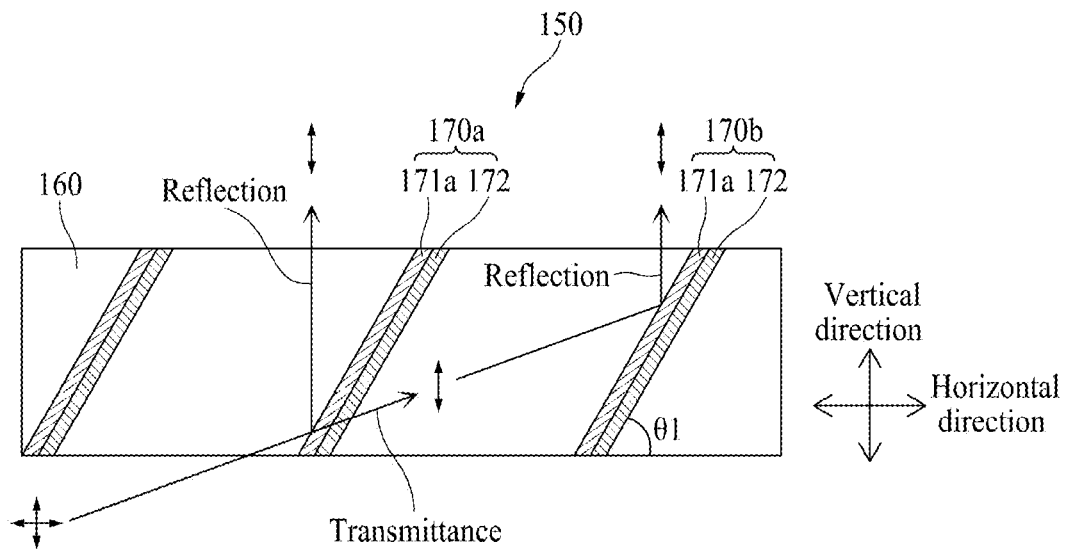
FIGS. 6A and 6B are cross-sectional views illustrating a principle of an optical film according to various example embodiments of the present disclosure.
Figure 6B:
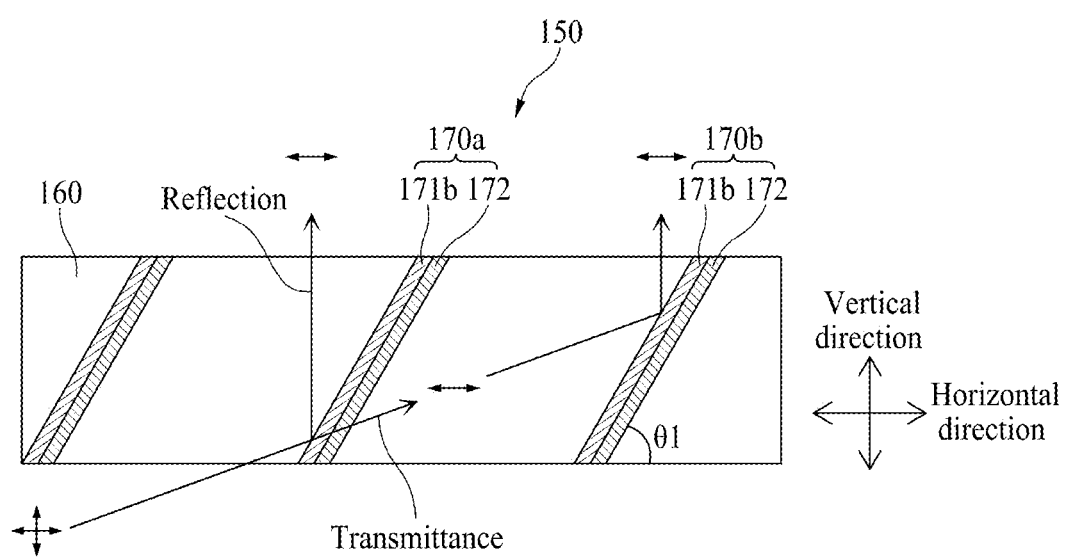

FIGS. 6A and 6B are cross-sectional views illustrating a principle of an optical film according to various example embodiments of the present disclosure.

The examples of FIGS. 6A and 6B correspond to vertical sections as viewed in a front direction in the example of FIG. 2. FIG. 6A illustrates that the barrier 170 including combination of the first film 171a and the second film 172 according to the FIG. 5A example may be used. FIG. 6B illustrates that the barrier 170 including a combination of the first film 171b and the second film 172 according to FIG. 5B example may be used.

As seen from the FIG. 6A example, if light, which may include light polarized in a horizontal direction and light polarized in a vertical direction, enters an optical sheet 150, the incident light may enter the first film 171a in any one barrier 170a after transmitting the base layer 160 that may have no polarizing characteristic. The light entering the optical sheet 150 may be light emitted from a light source (e.g., light source 120 of the FIG. 1 example) and then is emitted through a light guide plate (e.g., light guide plate 110 of the FIG. 1 example) or emitted through a diffusion sheet (e.g., diffusion film 140 of the FIG. 1 example) after passing through the light guide plate. As such, the light polarized in the vertical direction may be reflected from the first film 171a in any one barrier 170a, and then may be emitted through an upper surface of the optical sheet 150.

The light polarized in the horizontal direction may be transmitted through the first film 171a, and then may be phase-retarded in the second film 172 in any one barrier 170a, whereby the light polarized in the vertical direction may be emitted. The light emitted from the second film 172 in any one barrier 170a and polarized in the vertical direction may be transmitted through the base layer 160, that may have no polarizing characteristic, and then may enter the first film 171a in the other one barrier 170b adjacent to the barrier 170a. As such, the light polarized in the vertical direction may be reflected from the first film 171a in the other one barrier 170b, and may be emitted through the upper surface of the optical sheet 150.

As described above, according to an example embodiment of the present disclosure, the light entering the optical sheet 150, then polarized in the vertical direction, may be reflected from the first film 171a in any one barrier 170a, and then may be emitted. The light entering the optical sheet 150, then polarized in the horizontal direction, may be phase-retarded in the second film 172 in any one barrier 170a. Then, the light may be reflected in the first film 171a in the other one barrier 170b adjacent to the barrier 170a, and then may be emitted. Therefore, when all of the light entering the optical sheet 150 and polarized in the vertical direction and the light entering the optical sheet 150 and polarized in the horizontal direction are emitted through the upper surface of the optical sheet 150, light loss may be reduced or minimized.

Also, according to an example embodiment of the present disclosure, when the light emitted from the optical sheet 150 is reflected from the first film 171a in the barriers 170a and 170b, a first inclined angle θ1 of the first film 171a may be controlled properly to emit the light emitted from the optical sheet 150 in the vertical direction, whereby the vertical light may enter the display panel (e.g., display panel 200 of the FIG. 1 example), even without the prism sheet of the related art.

As seen from the FIG. 6B example, if light, which may include light polarized in a horizontal direction and light polarized in a vertical direction, enters the optical sheet 150, the incident light may enter the first film 171a in any one barrier 170a after transmitting the base layer 160 that may have no polarizing characteristic.

The light polarized in the horizontal direction may be reflected from the first film 171a in any one barrier 170a, and then may be emitted through the upper surface of the optical sheet 150. The light polarized in the vertical direction may transmit through the first film 171a, and then may be phase-retarded in the second film 172 in any one barrier 170a, whereby the light polarized in the horizontal direction may be emitted.

The light emitted from the second film 172 in any one barrier 170a and polarized in the horizontal direction may transmit through the base layer 160 that may have no polarizing characteristic, and then may enter the first film 171a in the other one barrier 170b adjacent to the barrier 170a. The light polarized in the horizontal direction may be reflected from the first film 171a in the other one barrier 170b, and may be emitted through the upper surface of the optical sheet 150.

As described above, according to another embodiment of the present disclosure, the light entering the optical sheet 150, then polarized in the horizontal direction, may be reflected from the first film 171a in any one barrier 170a, and then may be emitted. The light entering the optical sheet 150, then polarized in the vertical direction, may be phase-retarded in the second film 172 in any one barrier 170a, then the light may be reflected in the first film 171b in the other one barrier 170b adjacent to the barrier 170a, and then may be emitted. Therefore, when all of the light entering the optical sheet 150 and polarized in the horizontal direction and the light entering the optical sheet 150 and polarized in the vertical direction are emitted through the upper surface of the optical sheet 150, light loss may be reduced or minimized.

Also, in the same manner as in the example of FIG. 6A, when the light emitted from the optical sheet 150 is reflected from the first film 171b in the barriers 170a and 170b, a first inclined angle θ1 of the first film 171b may be controlled properly to emit the light emitted from the optical sheet 150 in the vertical direction, whereby the vertical light may enter the display panel (e.g., display panel 200 of the FIG. 1 example), even without the prism sheet of the related art.

Hereinafter, a method for controlling the first inclined angle θ1 will be described.

Figure 7A:
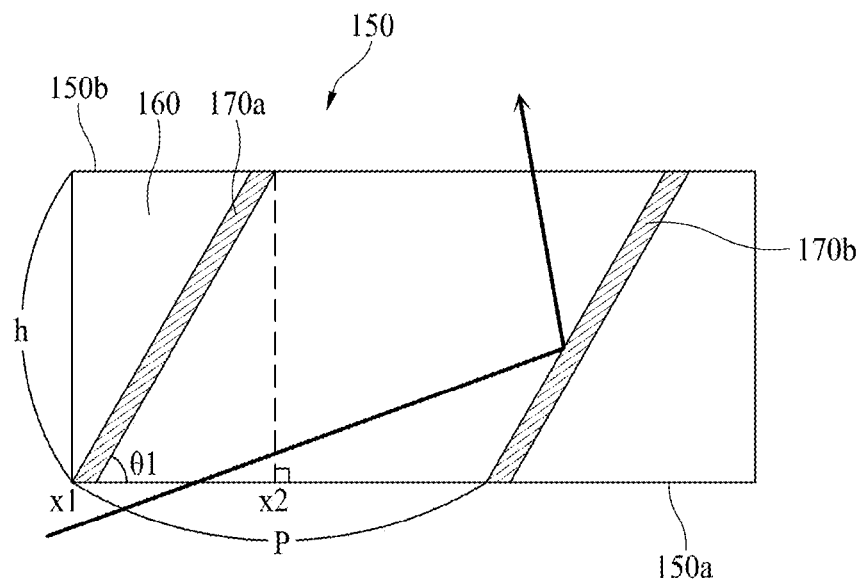
FIGS. 7A to 7C are views illustrating a method for controlling a first inclined angle of a barrier according to an example embodiment of the present disclosure.
Figure 7B:
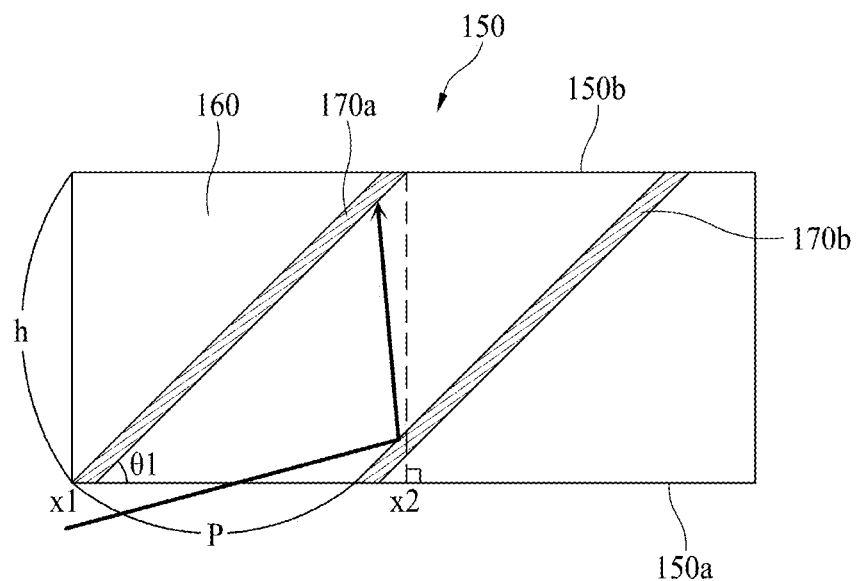
Figure 7C:
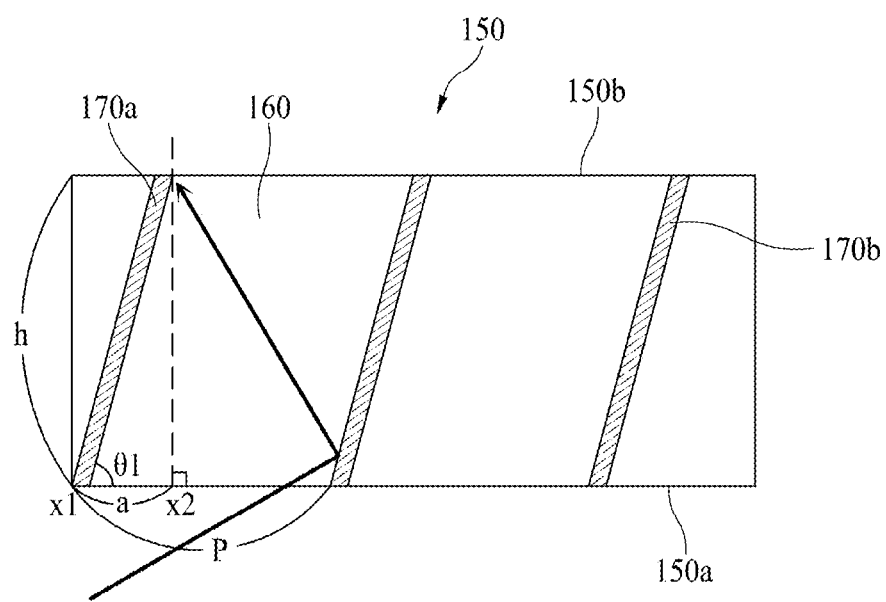

FIGS. 7A to 7C are views illustrating a method for controlling a first inclined angle of a barrier according to an example embodiment of the present disclosure.

As described above, when one barrier 170 is configured by combination of the first films 171a and 171b and the second film 172, a first inclined angle θ1 of the barrier 170 may be the same as a first inclined angle θ1 of each of the first films 171a and 171b and the second film 172. Therefore, in the examples of FIGS. 7A to 7C, instead of the first films 171a and 171b and the second film 172, the composite of the barrier 170 is shown for convenience.

As seen from FIGS. 7A to 7C, the optical film 150 according to an example embodiment of the present disclosure may include a plurality of base layers 160 and barriers 170a and 170b provided between the plurality of base layers 160. Each of the plurality of barriers 170a and 170b may extend from a lower surface 150a to an upper surface 150b of the optical film 150, while having a first inclined angle θ1 with respect to the lower surface 150a of the optical film 150. The following Equation 1 is established in respect of the first angle θ1.

[Equation 1]

$$\tan(\theta_1) = h/a$$

In the above Equation 1, 'h' is a height of the optical film 150, and 'a' is a distance from x1 to x2. 'x1' is a point at which one end of the barriers 170a and 170b, which adjoin the lower surface 150a of the optical film 150, are disposed, and 'x2' is a point at which an imaginary line vertically extending the other ends of the barriers 170a and 170, adjoining the upper surface 150b of the optical film 150 to the lower surface 150a of the optical film 150, is in contact with the lower surface 150a of the optical film 150.

A first consideration in setting the first inclined angle θ1 will be described with reference to the examples of FIGS. 7A and 7B. FIG. 7A illustrates an example in which the distance 'a' is smaller than a pitch 'P' of the barriers 170a and 170b. FIG. 7B illustrates an example in which the distance 'a' is greater than the pitch 'P' of the barriers 170a and 170b.

As seen from the FIG. 7A example, if the distance 'a' is smaller than the pitch 'P' of the barriers 170a and 170b, emitted light may not be interfered with by the barriers 170a and 170b adjacent to each other. However, as seen from the FIG. 7B example, if the distance 'a' is greater than the pitch 'P' of the barriers 170a and 170b, emitted light may be interfered with by the barriers 170a and 170b adjacent to each other.

That is, in the example of FIG. 7A, if incident light entering the optical film 150 does not transmit through any one barrier 170a, and enters other one barrier 170b adjacent to the barrier 170a, the light reflected from the other one barrier 170*b* may be emitted to the upper surface 150*b* of the optical film 150 without being interfered with by the any one barrier 170*a*.

On the contrary, in the example of FIG. 7B, if incident light entering the optical film 150 does not transmit through any one barrier 170*a*, and enters another one barrier 170*b* adjacent to the barrier 170*a*, the light reflected from the other one barrier 170*b* may be interfered with by the any one barrier 170*a*, whereby the light may not be emitted to the upper surface 150*b* of the optical film 150.

As seen from the examples of FIGS. 7A and 7B, it may be preferable that the distance 'a' is smaller than the pitch 'P' of the barriers 170*a* and 170*b*. Because the distance 'a' becomes [h/tan(θ1)] from Equation 1, it may be preferable that the following Equation 2 is satisfied.

[Equation 2]

$$h/\tan(\theta 1) < p$$

$$\Rightarrow h/p < \tan(\theta 1)$$

From Equation 2, it may be preferable that a tangent value [tan(θ1)] of the first angle θ1 of the barriers 170*a* and 170*b* is set to be greater than a value obtained by dividing the height 'h' of the optical film 150 by the pitch 'P' of the barriers 170*a* and 170*b*. If the height 'h' of the optical film 150 and the pitch 'P' of the barriers 170*a* and 170*b* are determined, and the first inclined angle θ1 of the barriers 170*a* and 170*b* is set to a too small value, the emitted light may be interfered with by the barriers 170*a* and 170*b* adjacent to each other. Therefore, it may be preferable that the first inclined angle θ1 of the barriers 170*a* and 170*b* is set to an angle range calculated in accordance with the above Equation 2 to allow the emitted light not to be interfered with by the barriers 170*a* and 170*b* adjacent to each other.

The second consideration in setting the first inclined angle θ1 will be described with reference to FIG. 7C. FIG. 7C illustrates an example in which the distance 'a' is smaller than a pitch 'P' of the barriers 170*a* and 170*b* in the same manner as in the example of FIG. 7A. However, FIG. 7C illustrates an example in which the first inclined angle θ1 is set to a too great value.

As seen from the FIG. 7C example, if the first inclined angle θ1 of the barriers 170*a* and 170*b* is set to a too great value, the emitted light may be interfered with by the barriers 170*a* and 170*b* adjacent to each other. Therefore, it may be preferable that the first inclined angle θ1 of the barriers 170*a* and 170*b* is set to a particular angle or less. Based on experimental results, it may be preferable that the following Equation 3 is satisfied.

[Equation 3]

$$\tan(\theta 1) < h/(0.8\, P)$$

From Equation 3, it may be preferable that a tangent value [tan(θ1)] of the first angle θ1 of the barriers 170*a* and 170*b* is set to be smaller than a value obtained by dividing the height 'h' of the optical film 150 by 0.8 times of the pitch 'P' of the barriers 170*a* and 170*b*. If the height 'h' of the optical film 150 and the pitch 'P' of the barriers 170*a* and 170*b* are determined, it may be preferable that the first inclined angle θ1 of the barriers 170*a* and 170*b* is set to an angle range calculated in accordance with the above Equation 3 to allow the emitted light to not be interfered with by the barriers 170*a* and 170*b* adjacent to each other.

As a result, considering Equation 2 and Equation 3, the first inclined angle θ1 of the barriers 170*a* and 170*b* may be set to satisfy the following Equation 4.

[Equation 4]

$$h/p < \tan(\theta 1) < h/(0.8P)$$

FIGS. 8A to 8D are process views illustrating a method for manufacturing an optical film according to an example embodiment of the present disclosure.

Figure 8A:
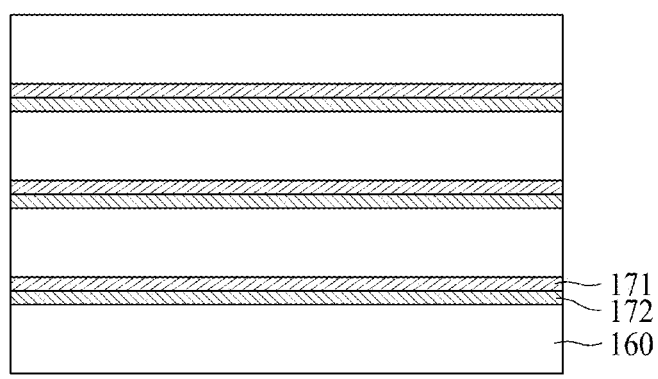
FIGS. 8A to 8D are process views illustrating a method for manufacturing an optical film according to an example embodiment of the present disclosure.
Figure 8B:
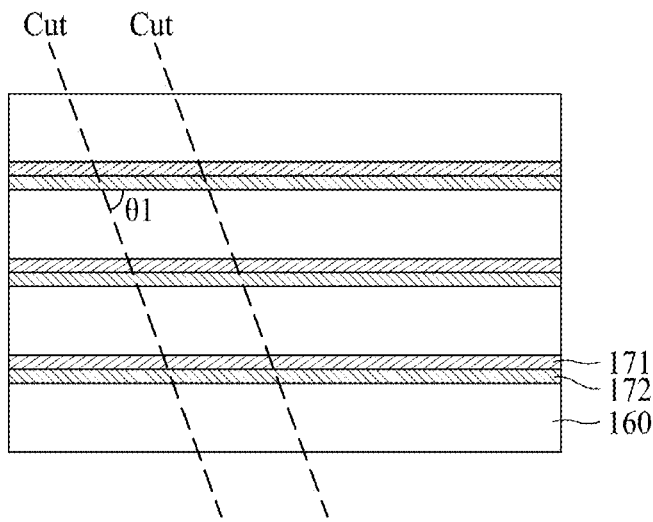

First of all, as seen from the example of FIG. 8A, a base layer 160, a second film 172, and a first film 171 may be repeatedly deposited in the above order. Afterwards, the base layer 160, the second film 172, and the first film 171 may be subjected to thermal compression to obtain a particular deposition structure. Next, as seen from the example of FIG. 8B, the deposition structure may be cut in a vertical direction to have a first inclined angle θ1 with respect to a horizontal plane.

Figure 8C:
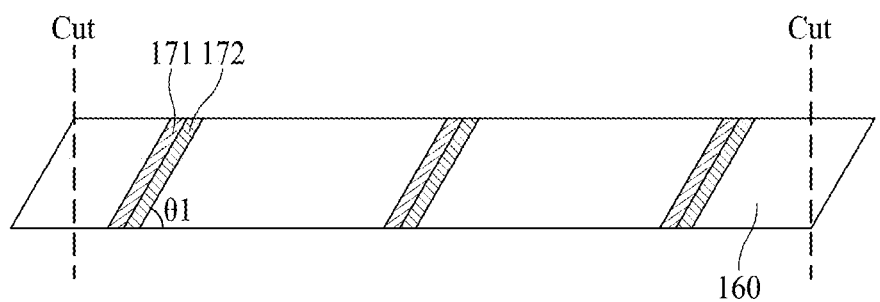
Figure 8D:
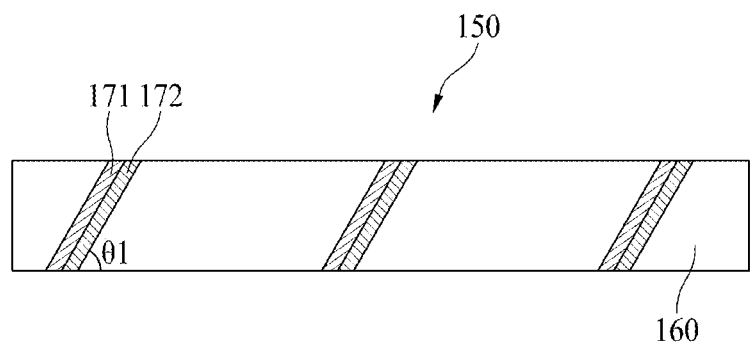

Next, as seen from the example of FIG. 8C, leftmost and rightmost base layers 160 may be cut in a vertical direction. Then, as shown in the example of FIG. 8D, an optical film 150 may be obtained, which may include a plurality of barriers 170, which may include first and second films 171 and 172 inclined with a first inclined angle θ1, and base layers 160 provided between the plurality of barriers.

As described above, according to example embodiments of the present disclosure, the following advantages may be obtained.

According to an example embodiment of the present disclosure, the light entering the optical sheet, then polarized in the first direction, may be reflected from the first film in any one barrier, and then may be emitted. After the light entering the optical sheet and polarized in the second direction is phase-retarded in the second film in any one barrier, the light may be reflected in the first film in the other one barrier adjacent to the barrier, and then may be emitted. Therefore, when all of the light entering the optical sheet and polarized in the first direction and the light entering the optical sheet and polarized in the second direction are emitted through the upper surface of the optical sheet, light loss may be reduced or minimized.

Also, according to an example embodiment of the present disclosure, when the light emitted from the optical sheet is reflected from the first film in the barriers, a first inclined angle of the first film may be controlled properly to emit the light emitted from the optical sheet in the vertical direction. Therefore, the vertical light may enter the display panel, even without the prism sheet of the related art.

In addition to the effects of the present disclosure as mentioned above, additional advantages and features of the present disclosure will be clearly understood by those skilled in the art from the above description of the present disclosure.

The various embodiments described above can be combined to provide further embodiments. Any and all of the U.S. patents, U.S. patent application publications, U.S. patent applications, foreign patents, foreign patent applications and non-patent publications referred to in this specification and/or listed in the corresponding Application Data Sheet are incorporated herein by reference, in their entirety. Aspects of the embodiments can be modified, if necessary to employ concepts of the various patents, applications and publications to provide yet further embodiments.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. An optical film, comprising:
a plurality of base layers arranged at predetermined intervals in a horizontal direction; and
a plurality of barriers respectively provided between pairs of the plurality of base layers,
wherein each of the plurality of barriers comprises first and second films inclined with a first inclined angle with respect to a lower surface of each of the plurality of base layers,
wherein the plurality of barriers include a first barrier and a second barrier facing each other by interposing any one of the plurality of base layers therebetween, and the second film of the first barrier faces the first film of the second barrier with the one of the plurality of base layers interposed therebetween,
wherein the first film of the first barrier is configured to:
transmit light polarized in a first direction, and
reflect light polarized in a second direction perpendicular to the first direction so as to emit the reflected light through an upper surface of an optical sheet, and
wherein the second film of the first barrier is configured to phase-retard the light polarized in the first direction to the light polarized in the second direction to allow the light phase-retarded to enter the first film of the second barrier, and
wherein the first film of the second barrier is provided to reflect the light phase-retarded in the second film of the first barrier so as to emit the reflected light through an upper surface of the optical sheet.

2. The optical film of claim 1, wherein:
the plurality of base layers are in contact with the plurality of barriers; and
the first film and the second film are in contact with each other.

3. The optical film of claim 1, wherein:
the lower surface and an upper surface of each of the plurality of base layers are parallel with each other; and
a height from the lower surface to the upper surface of each of the plurality of base layers is the same as a height from a lower surface to an upper surface of each of the plurality of barriers.

4. The optical film of claim 3, wherein:
the lower surface of each of the plurality of base layers and the lower surface of each of the plurality of barriers are on a first plane to form a lower surface of the optical film; and
the upper surface of each of the plurality of base layers and the upper surface of each of the plurality of barriers are on a second plane to form an upper surface of the optical film.

5. The optical film of claim 1, wherein each of the plurality of base layers comprises a transparent material having no polarizing characteristic.

6. The optical film of claim 1, wherein:
the first film comprises a reflective polarizing film; and
the second film comprises a ½ λ phase retardation film.

7. The optical film of claim 1, wherein the first inclined angle satisfies the following Equation:

$h/p < \tan(\theta 1)$ where:
θ1 is the first inclined angle,
'h' is a height of the optical film, and
'p' is a pitch of the barrier.

8. The optical film of claim 1, wherein the first inclined angle satisfies the following Equation:

$\tan(\theta 1) < h/(0.8P)$ where:
θ1 is the first inclined angle,
'h' is a height of the optical film, and
'P' is a pitch of the barrier.

9. A backlight unit, comprising:
a light source;
a light guide plate facing the light source and configured to change a path of light emitted from the light source;
a reflective plate below the light guide plate; and
an optical film above the light guide plate, the optical film comprising:
a plurality of base layers arranged at predetermined intervals in a horizontal direction; and
a plurality of barriers respectively provided between pairs of the plurality of base layers,
wherein each of the plurality of barriers comprises first and second films inclined with a first inclined angle with respect to a lower surface of each of the plurality of base layers,
wherein the plurality of barriers include a first barrier and a second barrier facing each other by interposing any one of the plurality of base layers therebetween, and the second film of the first barrier faces the first film of the second barrier with the one of the plurality of base layers interposed therebetween,
wherein the first film of the first barrier is configured to:
transmit light polarized in a first direction, and
reflect light polarized in a second direction perpendicular to the first direction so as to emit the reflected light through an upper surface of an optical sheet, and
wherein the second film of the first barrier is configured to phase-retard the light polarized in the first direction to the light polarized in the second direction to allow the light phase-retarded to enter the first film of the second barrier, and
wherein the first film of the second barrier is provided to reflect the light phase-retarded in the second film of the first barrier so as to emit the reflected light through an upper surface of the optical sheet.

10. The backlight unit of claim 9, wherein:
the lower surface and an upper surface of each of the plurality of base layers are parallel with each other; and
a height from the lower surface to the upper surface of each of the plurality of base layers is the same as a height from a lower surface to an upper surface of each of the plurality of barriers.

11. A display device, comprising:
a backlight unit; and
a display panel above the backlight unit,
wherein the backlight unit comprises an optical film provided below the display panel, and
wherein the optical film comprises:
a plurality of base layers arranged at predetermined intervals in a horizontal direction, and
a plurality of barriers respectively provided between pairs of the plurality of base layers,
wherein each of the plurality of barriers comprises first and second films inclined with a first inclined angle with respect to a lower surface of each of the plurality of base layers,
wherein the plurality of barriers include a first barrier and a second barrier facing each other by interposing any one of the plurality of base layers therebetween, and the second film of the first barrier faces the first film of the second barrier with the one of the plurality of base layers interposed therebetween, wherein the first film of the first barrier is configured to:
transmit light polarized in a first direction, and
reflect light polarized in a second direction perpendicular to the first direction so as to emit the reflected light through an upper surface of an optical sheet, and wherein the second film of the first barrier is configured to phase-retard the light polarized in the first direction to the light polarized in the second direction to allow the light phase-retarded to enter the first film of the second barrier, and wherein the first film of the second barrier is provided to reflect the light phase-retarded in the second film of the first barrier so as to emit the reflected light through an upper surface of the optical sheet.

12. The display device of claim 11, further comprising:
a polarizer between the display panel and the optical film,
wherein the polarizer has a transmissive axis in the same direction as a polarizing direction of light emitted from the optical film.

13. The display device of claim 11, wherein:
the plurality of base layers are in contact with the plurality of barriers; and
the first film and the second film are in contact with each other.

14. The display device of claim 11, wherein:
the lower surface and an upper surface of each of the plurality of base layers are parallel with each other; and
a height from the lower surface to the upper surface of each of the plurality of base layers is the same as a height from a lower surface to an upper surface of each of the plurality of barriers.

15. The display device of claim 14, wherein:
the lower surface of each of the plurality of base layers and the lower surface of each of the plurality of barriers are on a first plane to form a lower surface of the optical film; and
the upper surface of each of the plurality of base layers and the upper surface of each of the plurality of barriers are on a second plane to form an upper surface of the optical film.

16. The display device of claim 11, wherein each of the plurality of base layers comprises a transparent material having no polarizing characteristic.

17. The display device of claim 11, wherein:
the first film comprises a reflective polarizing film; and
the second film comprises a ½ λ, phase retardation film.

* * * * *